United States Patent [19]

Chamberlain et al.

[11] Patent Number: 4,975,589
[45] Date of Patent: Dec. 4, 1990

[54] THERMOLUMINESCENT DOSIMETER WITH IMPROVED CARD HOLDER

[75] Inventors: James D. Chamberlain, Maple Heights; Marko Moscovitch, South Euclid, both of Ohio

[73] Assignee: The Harshaw Chemical Company, Cleveland, Ohio

[21] Appl. No.: 222,949

[22] Filed: Jul. 22, 1988

[51] Int. Cl.$^5$ ................................................ G01T 1/11
[52] U.S. Cl. .............................. 250/484.1; 250/482.1
[58] Field of Search ........... 250/484.1 A, 337, 390.03, 250/482.1

[56] References Cited

U.S. PATENT DOCUMENTS 3,100,262  8/1963  Shenker et al. .............. 250/484.1 C
3,169,188  2/1965  Horner et al. .......................... 357/29
4,465,936  8/1984  Ishiguro et al. ............. 250/484.1 A Primary Examiner—Carolyn E. Fields
Attorney, Agent, or Firm—Renner, Otto, Boisselle & Sklar

[57] ABSTRACT

An improved dosimeter characterized by a filter construction which gives rise to improved angular independence of delivered dose. Also disclosed is an improved tamper-proof holder for a TLD card, and the holder also desirably provides a dirt and moisture resistant environment for the TLD card.

14 Claims, 3 Drawing Sheets

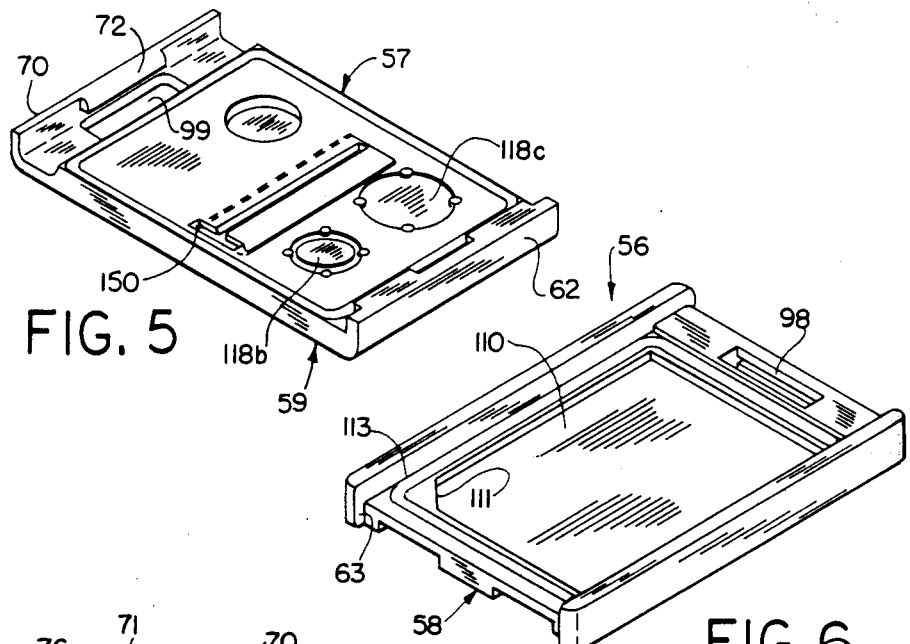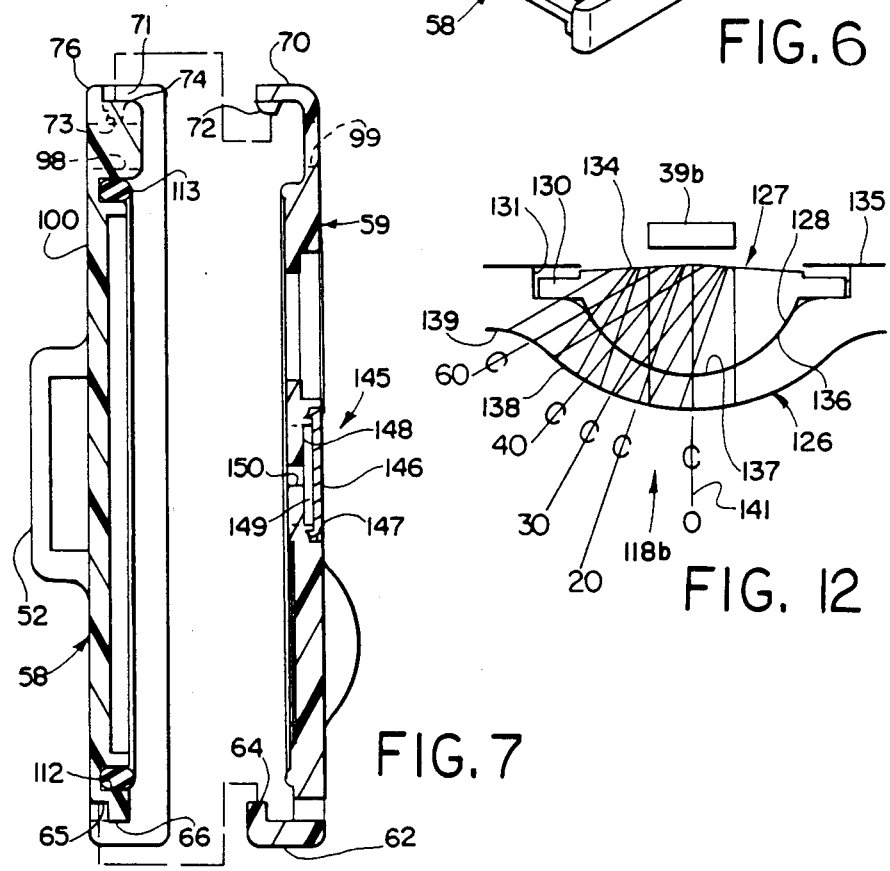

THERMOLUMINESCENT DOSIMETER WITH IMPROVED CARD HOLDER

The invention herein described relates generally to thermoluminescent dosimeters and, more particularly, to dosimeter card holders including filters.

BACKGROUND

Thermoluminescent dosimetry, commonly referred to as TLD, is a technique for radiation dose measurement. Thermoluminescence is an emission of light which occurs when thermoluminescent (TL) phosphors are heated after having been exposed to beta, gamma, x-ray or neutron radiation. TLD has several known advantages over other dosimetry techniques such as film dosimetry.

TLD systems have been developed for monitoring personnel who work in the vicinity of radiation materials, X-ray equipment, etc. In such systems, each person being monitored is given a dosimeter to wear as a badge that consequently will be exposed to the same dosage of radiation as the person wearing the dosimeter. Although different types of dosimeters have been used, generally the dosimeters consist of an outer holder which houses a TLD card insert usually containing two, three or four TL elements in crystal form. The TLD cards and/or holders may be provided with a machine readable code to enable card and/or holder identification.

Periodically the TLD cards are processed through a TLD card reader to obtain an exposure record for each person being monitored. In the TLD card reader, the TL elements in each card are heated and the thermoluminescence is measured as by using a photomultiplier tube and associated electronic circuitry to provide a read-out of the TL integrals and/or glow curve. The data obtained by the TLD reader is then analyzed with the use of appropriate algorithms to obtain useful absorbed dose information. The design and response characteristics of the dosimeter coupled with the dose calculation algorithms which translate the dosimeter response to risk related quantity (dose equivalent) are among the most important factors which affect overall performance of a dosimetry system.

To control or modify the radiation admitted to certain TL elements in the TLD card, card holders heretofore have contained filtration media. Each TL element may be covered by its own unique filter which provides a different radiation absorption thickness to allow dose estimation for various organs in risk. The response of the thusly filtered TL element may be dependent on the angle of incidence. That is, the response of the TL element to a source of radiation at 0° angle of incidence may be different from the response of the TL element to the same source of radiation at 45° angle of incidence. Algorithmic correction schemes have been used to correct for angular dependence of delivered dose, but it would be desirable to minimize the angular dependence of the dosimeter where desired and when possible.

SUMMARY OF THE INVENTION

The present invention provides an improved dosimeter characterized by a filter construction which gives rise to improved angular independence of delivered dose. The invention also independently provides an improved tamper-proof holder for a TLD card, and the holder also desirably provides a dirt and moisture resistant environment for the TLD card.

According to one aspect of the invention, a dosimeter assembly comprises a TL element and a filter for the TL element, the filter including two tissue equivalent filter elements one overlying the other along a center axis radiating from the TL element. The filter elements have different densities and different thicknesses which vary from the center axis to a perimeter of the filter. In a preferred embodiment, one of the filter elements has a thickness progressively decreasing from the center axis to a perimeter of the one filter element, and the other of the filter elements has a thickness progressively increasing from the center axis to a perimeter of the other filter element. Overall, the combined thickness of the filter elements progressively decreases from the center axis to a perimeter of the filter.

Still more particularly, one of the filter elements is hemispherical in shape and the other of the filter elements is dome shaped and has a surface adjacent and generally corresponding to the spherical surface of the hemispherical filter element. The other filter element preferably is formed by a dome-shaped portion of a housing for a TLD card and the dome-shaped portion forms a pocket containing the hemispherical filter element.

According to another aspect of the invention, a dosimeter assembly comprises a TLD card and a holder for the card. The TLD card holder includes first and second housing members relatively movable towards and away from one another to close and open the holder. The first housing member includes an opening having an outer end and an inner end, and the second housing member has a catch movable through the outer end of the opening to engage in the opening to lock the holder closed. At least one of the housing members includes a restricted access passage for permitting restricted access by a tool to the inner end of the opening for pushing the catch out of the opening to unlock the holder. The restricted access passage extends generally perpendicularly to the opening. The tool has guide pins insertable into the restricted access passage and a blade movable right angles to the guide pins for moving into the opening and pushing the catch out of the opening.

According to a further aspect of the invention, a holder for a TLD card comprises first and second housing members relatively movable towards and away from one another to close and open the holder, and means to lock the housing members closed. The housing member includes a pocket for receiving the TLD card and a groove circumscribing the pocket. An annular gasket is contained in the groove for engaging an inner surface of the second housing member to form a seal around the TLD card. The second housing member preferably has an annular bead projecting from the inner surface thereof and corresponding to the annular gasket to press into the annular gasket when the holder is closed.

The foregoing and other features of the intention are hereinafter fully described, the following description and the annexed drawings setting forth in detail a certain illustrative embodiment of the invention, this being indicative, however, of but one of the ways in which the principles of the invention may be employed.

BRIEF DESCRIPTION OF THE DRAWINGS

In the annexed drawings:

FIG. 5 is an isometric view of a cover assembly forming one half of the TLD card holder;

FIG. 6 is an isometric view of a base assembly forming the other half of the TLD card holder;

FIG. 7 is an exploded sectional view through the TLD card holder, taken along the line 7—7 of FIG. 4;

FIG. 12 is an enlarged view of a deep dose filter included in the TLD card holder with various lines of angular incidence being shown.

DETAILED DESCRIPTION

Figures 1, 2:
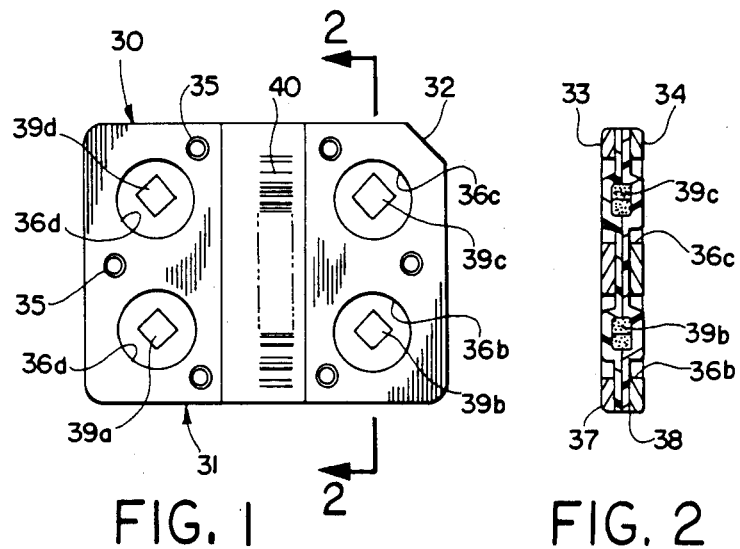
FIG. 1 is a top plan view of an exemplary TLD card.
FIG. 2 is a sectional view through the TLD card, taken along the line 2—2 of FIG. 1.
Figures 3, 4:
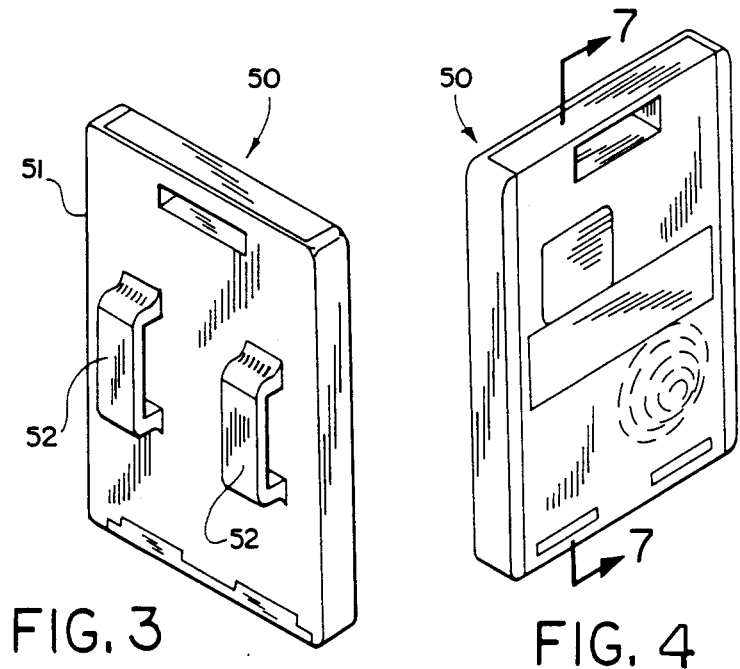
FIG. 3 is an isometric view of a TLD card holder according to the invention, looking at the back side of the holder.
FIG. 4 is an isometric view of the TLD card holder, looking at the front side of the holder.

A preferred embodiment of dosimeter according to the present invention generally comprises TLD card indicated generally at 30 in FIGS. 1 and 2 and a TLD card holder indicated generally at 50 in FIGS. 3 and 4.

As seen in FIGS. 1 and 2, the TLD card 30 includes a thin substrate 31 of rectangular shape except for the provision of a beveled orientation identification corner 32. The substrate 31 consists of two aluminum plates 33 and 34 that are secured together by rivets 35. The plates 33 and 34 have aligned holes forming four windows 36a–d which are arranged in a rectangular pattern at respective quadrants defined by major and minor axes of the substrate. Sandwiched between the plates 33 and 34 are two sheets 37 and 38 of transparent heat resistant material such as transparent Teflon (PTFE) that encapsulates TL elements 39a–d at respective windows 36a–d. The TLD card also carries a machine readable code 40 extending along the minor axis of the card between the furthest spaced pairs of the windows.

The thermoluminescent materials of the TL elements 39a–d may be selected to suit a particular application such as detection of one or more different types of radiation. The number of TL elements may be varied as desired.

In FIGS. 3 and 4, the holder 50 adapted to contain the illustrated TLD card 30 can be seen to have a rectangular housing 51. The housing 51 has on its back side a pair of laterally spaced apart loops 52 and 53. The loops 52 and 53 provide a convenient means for attachment of clip devices (not shown) or the like which permit wearing of the dosimeter like a badge, as is customary.

Referring now to FIGS. 5–7, the TLD card holder 50 includes a base assembly (base or bottom half) 56 and a cover assembly (cover or top half) 57. The base assembly 56 and cover assembly 57 include respective parts of the housing 51, i.e., housing base 58 and housing cover 59. The base 58 and cover 59 of the housing may be of plastic or plastic-like material; in the illustrated embodiment the housing base and cover are made of ABS plastic.

The housing base 58 and housing cover 59 have at opposite ends thereof attachment elements which cooperate to allow the housing base and housing cover to be snapped together to close in holder. More particularly, the housing cover 59 has at one end a hinge hook 62 extending inwardly from the edge of the housing cover and the housing base 58 has at its corresponding end a large recess 63 for receiving the hinge hook 62. The hinge hook 62 has at its inner end a pair of laterally spaced apart hook elements or barbs 64 which engage in laterally spaced apart slots 65 in the bottom of the recess 63. The slots 65 define lips 66 that become captured in the bite of the hinge hook when the housing base and cover are brought together.

When engaged, the hook elements 64 and slots 65 form a hinge-like connection allowing the housing cover 59 and housing base 58 to be pivoted towards one another to close the holder. If desired a permanent hinge connection may be provided, although the illustrated detachable hinge connection is preferred to permit, for example, easy interchange of different cover assemblies with different base assemblies, as may be desired.

When pivoted to a closed position, the housing base 58 and housing cover 59 are snap-locked together at their ends opposite the hinge hooks 62 and recesses 63 by cooperating snap elements. More particularly, the housing cover has a snap hook 70 extending inwardly from the edge of the housing cover and the housing base has at its corresponding end a large recess 71 for receiving the snap hook 70. The snap hook 70 has at its inner end a centrally located hook element of catch 72 which can engage in slot-like opening 73 in the bottom of the recess 71.

Figure 9:
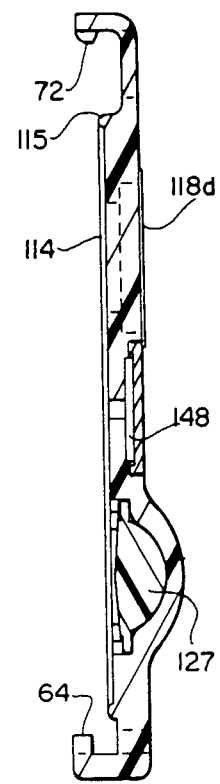
FIG. 9 is a sectional view through the cover assembly, taken along the line 9—9 of FIG. 8.

The snap hook 70 is sufficiently resiliently flexible to enable the catch 72 to be cammed over the bottom wall surface 74 of the recess 71. Once the catch comes to alignment with the opening 73 the resiliency of the snap hook will snap the catch into the opening 73 to lock the housing base and cover together. Preferably the catch 72 is in the form of a bead having a rounded leading end to facilitate the camming action and a squared off trailing end to prevent any reverse camming action that might result in accidental opening of the holder, as is best shown at the top of FIG. 9. As is shown in FIG. 7, the recess 71 is bordered by a back wall 76 to prevent insertion of a prying tool beneath the snap hook 70 to prevent someone from prying the catch 72 out of the opening 73.

The illustrated holder 50 is essentially tamper-resistant in that it is essentially impossible to open the holder by hand. Moreover, it is essentially impossible to open the holder with common tool without visual damage unless a special opening tool is used, such tool being shown at 80 in FIGS. 10 and 11. This prevents opening of the holder except by authorized personnel, i.e., those persons entrusted with the special opening tool 80.

Figure 10:
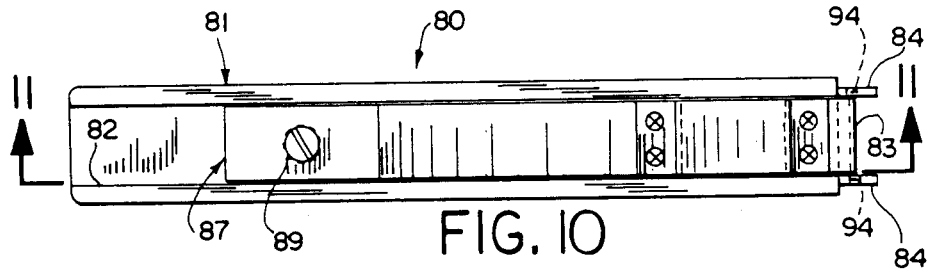
FIG. 10 is a plan view of an opening tool for the TLD holder.
Figure 11:
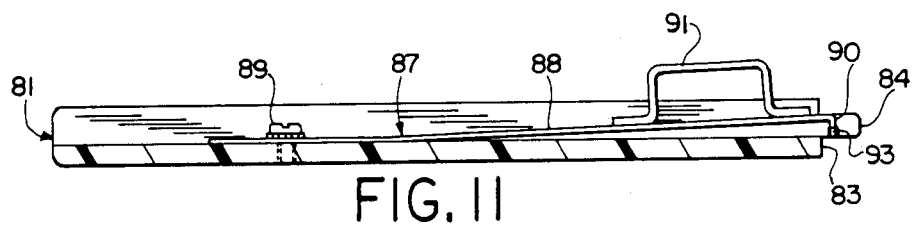
FIG. 11 is a sectional view through the opening tool, taken along the line 11—11 of FIG. 10.

As seen in FIGS. 10 and 11, the opening tool 80 includes an elongate handle 81 which is C-shape in cross-section. The handle 81 has in one side thereof a channel 82 extending from one end of the handle to the other. At it front end seen at the right in FIGS. 10 and 11 the handle has an end face 83 from which a pair of laterally spaced apart locating pins 84 project. The pins have inner surfaces flush with the side wall surfaces of the channel.

Mounted within the channel 82 is a metal strip 87 having one end fixedly secured screw 89 to the handle. Inwardly from the screw 89 the metal strip 87 is bent away from the bottom of the channel to form an actuator arm 88 spaced from the bottom of the channel. The bend forms a hinge permitting pivoting movement of the actuator arm towards and away from the bottom of the channel.

The free end of the actuator arm 88 extends beyond end face 83 of the handle 81 and terminates at a blade 90 bent downwardly as seen in FIG. 11 generally at right angles to the adjacent portion of the actuator arm. A button member 91 is fixed to the top side of the actuator arm proximate the blade. The button member protects above the top surface of the handle so that it may be pushed to urge the actuator arm downwardly towards and against the bottom of the channel to effect corresponding movement of the blade. Extending from opposite side edges of the blade 90 near the lower edge of the blade are ears 93. The ears 93 engage in slots 94 in the undersides of the locating pins 84 to limit or stop return movement of the actuator arm to locate the blade so that it neither protects above or below the locating pins 84. Preferably the metal strip 87 is bent sufficiently to upwardly bias the blade so that the ears 93 will normally ba seated in the slots 94 except when the button member 91 is depressed to actuate the blade.

The opening tool 80 is used by inserting the locating pins 84 into a slot-like opening or hole 98 in the back wall of the housing base 56 and corresponding opening or hole 99 in the front wall of the housing cover 57. The locating pins are spaced to fit easily but closely within the openings 98 and 99 widthwise, and the locating pins may have rounded noses to facilitate insertion into the openings 98 and 99.

The locating pins 84 are fully inserted until the end face 83 of the tool handle 81 engages the back surface 100 of the housing base 56. This will properly locate the blade 90, which would be extending upwardly in relation to the orientation of the holder as shown in FIG. 7 with the tool handle extending to the left at right angles to the holder and the button member 91 of the tool extending downwardly. When thusly properly located the blade will be aligned with the opening 73 which communicates with the opening 98 to provide interior access only to the catch 72. In this position the button member 91 of the tool may be depressed to urge the blade into the opening 73 to engage and push the catch 72 out of the opening 73 to release the catch and unlock the holder so that the housing halves may be opened and detached from one another. After the catch has been released and the holder opened the button member may be released and the tool removed.

Referring back to FIGS. 6–7, the housing base 58 has a rectangular shape pocket 110 sized to closely accommodate the TLD card 30 (FIGS. 1 and 2). One corner of the pocket is beveled to form a key 111 for proper orienting of the card in the pocket; the card can only fit one way in the pocket. The pocket is circumscribed by a groove 112 containing an annular resilient gasket 113. When the holder is closed as above described the gasket or seal 113 engages the inner side 114 of the housing cover 59 to provide a dirt and moisture resistant environment for the TLD card and the TL elements included therein. Preferably the housing cover has in its inner side a projecting bead 115 which coincides with the gasket and which bites or presses into the gasket when the holder is locked closed to form a tight seal. The gasket will be compressed and consequently will exert a force on the holder halves tending to urge the same away from on ®another. This advantageously assists opening of the holder as such force will cause the holder halves to spring apart when the catch 72 is released from opening 73.

When the TLD card 30 is properly contained within the holder 50, the TL elements 39a–d will be covered by their own unique filters 118a–d, respectively which are contained in the holder and, more particularly, the housing cover 58. The filters 118a–d provide different radiation absorption thicknesses to allow dose estimation for various organs in risk.

In the illustrated preferred dosimeter, TL element 39d is a thin solid TLD-700 phosphor (Lithium-7 enriched fluoride) having a preferred thickness of 0.09 mm. This element is protected from the environment by filter 118d which is a thin aluminized Mylar sheet having a preferred thickness of 0.0025 inch to provide tissue equivalent filtration of 7.5 mg/cm$^2$. The thin aluminized Mylar sheet corresponds to an open window 120 in the housing cover 59. The Mylar sheet 39d has adhesive on one side for affixing to the outer surface of the housing cover with the sheet spanning and completely closing the window 120.

The response of element 39d provides a basis for shallow dose estimation. As a result of its small thickness (a factor of 10 thinner than a heretofore standard 3 mm by 3 mm by 0.9 mm TLD ribbon), underestimation of shallow dose contribution of low energy beta rays in reduced. The small thickness of both the element (substantially less than 0.9 mm) and filter (substantially less than 0.9 mm) provide for improved response to high energy beta rays and enable the measurement of low energy beta particles.

TL elements 39b and 39c each are a thicker TLD-700 phosphor having a preferred thickness of about 0.4 mm. Element 39b is covered by filter 118b to provide a basis for deep dose estimation. The filter 118b provides a tissue equivalent filtration substantially greater than 250 mg/cm$^2$ and preferably about 1000 mg/cm$^2$ to minimize the contribution of high energy beta rays (Sr/Y-90) to the deep dose response and to provide tissue equivalent absorption thickness as close as possible to the actual depth in tissue where deep dose estimation is desired. This results in smaller correction factors to be applied to the response of the TL element in position 1 when the deep dose index is estimated. Further details of this filter are hereinafter discussed with reference to FIG. 12.

Element 39c is covered by filter 118c including a copier filter element 122 captured in shallow recess in the inner surface of the housing cover by hot-swaged tabs 123, as illustrated. The variation with of the photon attenuation characteristics of the copper filter element 122 gives the dosimeter the ability to act as a crude energy spectrometer for low energy photons. In addition to the copper filter element 122, the filter 118c includes a second filter element 124 formed by the corresponding region of the housing cover 59. The copper filter element may be 0.1 mm thick, and the filter element of ABS plastic may be 2.3 mm thick for a tissue equivalent filtration of 242 mg/cm$^2$.

TL element 39a is a neutron sensitive, TLD-600 phosphor (Lithium-6 enriched fluoride) having a preferred thickness of 0.4. This element is shielded by a 300 mg/cm$^2$ tissue equivalent filter 118a which is simply the region of the housing cover covering TL element 118a, such region having a thickness of about 2.9 mm. This enables dose estimation to the lens of the eye and to measure neutron dose in the absence of thermal neutrons. TLD-600 and TLD-700 type phosphors are available from Harshaw Crystal & Electronic Products, Solon, Ohio.

For further details of preferred TL phosphors and filters, reference may be had to the copending application of Marko Moscovitch entitled PERSONNEL TL DOSIMETRY METHOD AND APPARATUS FOR DETERMINATION OF RISK RELATED QUANTITY, Ser. No. 07/216,343 and filed on July 7, 1988, which application is hereby incorporated herein by reference.

Referring noW to FIG. 12, the deep dose filter 118$b$ is a composite filter consisting of two plastic filtering media 126 and 127. The first filtering media or filter element 126 is formed by a region of the plastic housing cover 59 which covers the TL element 39$b$ in respect of incident radiation. As above indicated, the filter element 126 preferably would be composed of ABS plastic; accordingly, such element is hereinafter referred to as the ABS filter element. In the illustrated preferred embodiment, the ABS filter element 126 has a dome shape which forms a dome shape recess 128. The other filter element 127 is a plastic disc-like body preferably formed of Teflon (PTFE). It will be appreciated that the filter elements 126 and 127 may be made of other tissue equivalent materials provided they have different densities. A tissue equivalent material, as generally defined in the art, is a material that has an effective atomic number of about 7.4, this corresponding to the effective atomic number of soft tissue.

Figure 8:
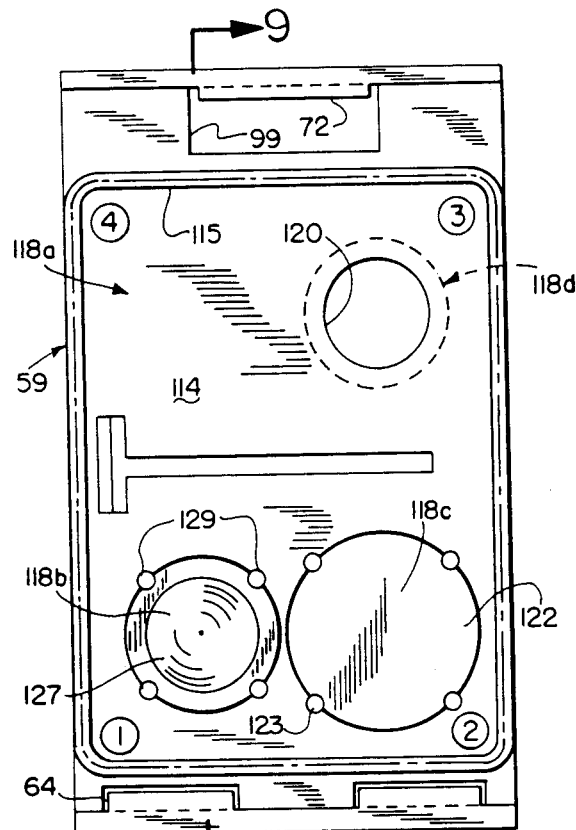
FIG. 8 is an inside plan view of the cover assembly.

The Teflon filter element 127 is captured in the dome recess 128 by hot-swaged tabs best seen at 129 in FIG. 8. The tabs 129 are swaged over and annular mounting flange 130 on the Teflon filter element which fits in an outer perimeter recess 131 surrounding the dome recess 128.

The Teflon filter element 127, which is hemispherical in shape, has a substantially flat or planar surface 134 which in the illustrated embodiment is provided with a slight bevel of about 3° going from the center to the perimeter of such surface. The surface 134 is substantially flush or slightly recessed in relation to the inner surface the housing cover 59. The diameter of this surface is about three times the width of a square TL element 39$b$ or three times the diameter of a circular TL element 39$b$.

The opposite surface 136 of the Teflon filter element 127,, i.e., the surface more remote from TL element 39$b$, is semi-spherical excepting the annular flange 130. This semi-spherical surface 136 substantially matches the inner semi-spherical surface 137 of the ABS filter element 126. The outer surface 138 of the ABS filter element also is preferably semi-spherical but of larger radius to provide for progressively increasing wall thickness going from the center to the perimeter of the dome shape ABS filter element 126, until the outer surface blends into the surrounding planar outer surface 139 of the housing cover 59.

The objective of this configuration is to provide a TL response, in this case a deep dose response, which is uniform over a wide angle of incidence preferably greater than about 90° and most preferably as great as about 120°. This is accomplished by selecting the thicknesses of the two tissue equivalent filter elements of different densities so that the TL element 39$b$ across its face for any given angle of incidence within specified range, in this case 120°, sees an average tissue equivalent filtration equal the desired tissue equivalent filtration for the dosimeter element.

This is demonstrated by lines of incidence shown in FIG. 12 and the following table. The ABS filter element 126 and Teflon filter element 127 have thickness densifies of 2.6416 mg/cm$^2$ per mil and 5.5118 mg/cm$^2$ per mil, respectively. In the table the thicknesses of the filter elements and the resultant individual and total thickness densities are shown for the outer edges (left and right) and the center of the TL element at angles of incidence of 0°, 20°, 30°, 40° and 60°, going in the clockwise direction in FIG. 12. The results would be the same for corresponding angles of incidence going in the counter-clockwise direction for a total range of 120° because of symmetry. The results also would be the same going into and out of the plane of the paper, again because of symmetry.

As illustrated the central axis 141 of the filter elements 126 and 127 extends perpendicular to and through the center of the TL chip 39$b$ and coincides with a 0° angle of incidence through the center of the TL chip.

The table also gives the average tissue equivalent filtration of thickness density for each angle cf incidence and it can be seen that the average values are essentially the same

| ANGLE /LINE | | PTFE THICK. | mg/cm2 | ABS THICK. | mg/cm2 | TOTAL mg/cm2 | AVG |
|---|---|---|---|---|---|---|---|
| 0 | L | .151 | 832 | .053 | 140 | 972 | 997 |
|   | C | .168 | 926 | .046 | 122 | 1047 |  |
|   | R | .151 | 832 | .053 | 140 | 972 |  |
| 20 | L | .124 | 683 | .065 | 172 | 855 | 998 |
|   | C | .165 | 909 | .051 | 135 | 1044 |  |
|   | R | .175 | 965 | .049 | 129 | 1094 |  |
| 30 | L | .110 | 606 | .073 | 199 | 799 | 999 |
|   | C | .161 | 887 | .058 | 153 | 1040 |  |
|   | R | .185 | 1019 | .051 | 134 | 1154 |  |
| 40 | L | .096 | 529 | .082 | 217 | 746 | 998 |
|   | C | .156 | 860 | .066 | 174 | 1034 |  |
|   | R | .193 | 1064 | .057 | 151 | 1214 |  |
| 60 | L | .089 | 491 | .102 | 269 | 760 | 998 |
|   | C | .130 | 717 | .093 | 246 | 962 |  |
|   | R | .192 | 1058 | .081 | 214 | 1272 |  | and essentially equal the desired tissue equivalent filtration of 1,000 mg/cm$^2$. The actual tissue equivalent filtration seen by the TL element would be slightly different because of the Teflon sheets 38 (FIG. 2) between which the TL element is sandwiched and the presence of any air gap, but the contribution of these factors is relatively small and may be compensated for, if desired, by algorithmic correction.

Other features of the TLD card holder 50 according to the invention include a window for identification labels or the like which can be viewed from the outside but only accessed from the inside. As seen in FIGS. 5 and 7-9, the window, indicated generally at 145, includes a clear plastic piece 146 which is secured in an inset 147 in the outer side of the housing cover 59 preferably with the outer surface of the plastic piece flush with the adjacent outer surface of the housing cover. The clear plastic element 146 extends transversely at about the middle of the housing cover and covers a recess or channel 148. The channel 148 and window element 146 together define a pocket 149 which is open to the inside of the housing cover by means of a T-slot 150. The head portion of the T-slot 150 corresponds in width to the width of the pocket 149 to permit insertion into the pocket of an identification bearing label. As will be appreciated, the pocket can only be accessed from the inside of the housing and hence only when the holder is open. Accordingly, unauthorized replacement of the identification label is precluded.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the hereto appended claims.

What is claimed is:

1. A dosimeter assembly comprising a TL element and a filter for said TL element, said filter including two tissue equivalent filter elements one overlying the other along a center axis radiating from said TL element, said filter elements having different thickness densities and different thicknesses which vary from said center axis to a perimeter of said filter.

2. A dosimeter as set forth in claim 1, wherein one of said filter elements has a thickness progressively decreasing from said center axis to a perimeter of said one filter element.

3. A dosimeter assembly as set forth in claim 2, wherein the other of said filter elements has a thickness progressively increasing from said center axis to a perimeter of said other filter element.

4. A dosimeter assembly as in claim 3, wherein the combined thickness of said filter elements progressively decreases from said center axis to a perimeter of said filter.

5. A dosimeter assembly forth in claim 1, wherein at least one of said filter elements has a thickness progressively increasing from said center axis to a perimeter of said at least one filter element.

6. A dosimeter assembly as set forth in claim 1, wherein one of said filter elements is hemispherical in shape.

7. A dosimeter assembly as set forth in claim 6, wherein the other of said filter elements is dome shaped and has a surface adjacent and generally corresponding to the spherical surface of the other filter element.

8. A dosimeter assembly as set forth in claim 1, comprising a substrate for carrying said TL element and a holder for said substrate, and wherein one of said filter elements is formed by a dome-shaped portion of said holder, said dome-shape portion forming a pocket containing the other filter element.

9. A dosimeter assembly as set forth in claim 1, wherein one of said filter elements includes a dome-shape member having opposite spherical surfaces of different radii.

10. A dosimeter assembly comprising a TLD card and a holder for said card, said TLD card holder including first and second housing members relatively movable towards and away from one another to close and open said holder, said first housing member including an edge portion including a wall with outer and inner surfaces, said wall including an opening extending between said surfaces, said opening having an outer end and an inner end respectively opening to said outer and inner surfaces, said second housing member having a catch movable through the outer end of said opening to engage in said opening to lock said holder closed, and at least one of said housing members including restricted access passage means inwardly adjacent said wall for permitting restricted access by a tool from outside said holder to the inner end of said opening for pushing said catch out of said opening to unlock said holder.

11. A dosimeter assembly as set forth in claim 10, wherein said restricted access passage extends generally perpendicular to said opening.

12. A dosimeter assembly as set forth in claim 10, wherein said catch is provided in a hook member which passes over said opening and precludes access to said opening through the outer end of said opening.

13. A holder for a TLD card comprising first and second housing members relatively movable towards and away from one another to close and open said holder, means to lock said housing members closed, said first housing member including a pocket for receiving the TLD card and a groove circumscribing said pocket, and annular gasket means contained in said groove for engaging an inner surface of said second housing member to form a seal around the TLD card, and wherein said second housing member has an annular bead projecting from the inner surface thereof and corresponding to the annular gasket to press into the annular gasket when the holder is closed.

14. In combination, a dosimeter assembly comprising a TLD card and a holder for said card and a tool for opening said holder of said dosimeter assembly, said TLD card holder including first and second housing members relatively movable towards and away from one another to close and open said holder, said first housing member including an edge portion including a wall with outer and inner surfaces, said wall including an opening extending between said surfaces, said opening having an outer end and an inner end respectively opening to said outer and inner surfaces, said second housing member having a catch movable through the outer end of said opening to engage in said opening to lock said holder closed, and at least one of said housing members including restricted access passage means inwardly adjacent said wall for permitting restricted access by said tool from outside said holder to the inner end of said opening for pushing said catch out of said opening to unlock said holder, said tool having guide means insertable into said restricted access passage means and blade means movable at right angles to said guide means for moving into said opening and pushing said catch out of said opening.

* * * * *